United States Patent
Choi et al.

(10) Patent No.: US 8,189,672 B2
(45) Date of Patent: May 29, 2012

(54) METHOD FOR INTERPOLATING CHROMINANCE SIGNAL IN VIDEO ENCODER AND DECODER

(75) Inventors: Kwang-Pyo Choi, Anyang-si (KR); Yun-Je Oh, Yongin-si (KR); Young-Hun Joo, Yongin-si (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 1302 days.

(21) Appl. No.: 11/893,811

(22) Filed: Aug. 17, 2007

(65) Prior Publication Data

US 2008/0095240 A1 Apr. 24, 2008

(30) Foreign Application Priority Data

Oct. 20, 2006 (KR) .................. 10-2006-0102539

(51) Int. Cl.
*H04B 1/66* (2006.01)
(52) U.S. Cl. ................................. 375/240.17
(58) Field of Classification Search .............. 380/213; 375/240.17
See application file for complete search history.

(56) References Cited

U.S. PATENT DOCUMENTS

| 6,628,327 | B1 | 9/2003 | Aoki et al. | 348/221.1 |
| 2003/0202607 | A1* | 10/2003 | Srinivasan | 375/240.29 |
| 2004/0062307 | A1* | 4/2004 | Hallapuro et al. | 375/240.13 |
| 2006/0133506 | A1* | 6/2006 | Dang | 375/240.17 |
| 2007/0133687 | A1* | 6/2007 | Wittmann et al. | 375/240.17 |

FOREIGN PATENT DOCUMENTS

| EP | 1675406 | 6/2006 |
| JP | 2003-333604 | 11/2003 |
| JP | 2006-093881 | 4/2006 |
| KR | 2004-106202 | 12/2004 |

OTHER PUBLICATIONS

Chih-Hung et al.,"A Unified Systolic Architecture for Combined Inter and Intra Predictions in H.264/AVC Decoder", Jul. 2006, ACM, pp. 73-78.*
Kuo et al., "A Memory Bandwidth Optimized Interpolator for Motion Compensation in the H.264 Video Decoding", 2006, IEEE, pp. 1244-1247.*
Goel et al., "Sub-Pixel Interpolation in Video Coding: Analysis and Design". 2006, pp. 223-228.*
Sihvo, Tero, et al.; "H.264/AVC Interpolation Optimization;" Signal Processing Systems Design and Implementation; IEEE Workshop on Athens, Greece; Nov. 2-4, 2005; XP010882587; 6 pgs.

* cited by examiner

*Primary Examiner* — Matthew Smithers
(74) *Attorney, Agent, or Firm* — Cha & Reiter, LLC (57) ABSTRACT

Disclosed is a method for interpolating chrominance signals in a video encoder and a decoder. The method includes the steps of accessing a memory unit to load an integer pixel value with regard to a plurality of motion compensation blocks, searching for a location of a motion vector s to perform sub-pixel interpolation of chrominance signals regarding the blocks and performing ¼ sub-pixel interpolation by row-based and column-based shifting when the motion vector indicates a ¼ location pixel with regard to the blocks. Also disclosed is an apparatus for performing the interpolating method described and a computer program product which when loaded into a computer system performs the interpolating method described.

20 Claims, 9 Drawing Sheets

METHOD FOR INTERPOLATING CHROMINANCE SIGNAL IN VIDEO ENCODER AND DECODER

CLAIM OF PRIORITY

This application claims the benefit of the earlier filing date, pursuant to 35 USC 119(a), to that patent application entitled "Method for Interpolating Chrominance Signal in Video Encoder and Decoder," filed with the Korean Intellectual Property Office on Oct. 20, 2006 and assigned Serial No. 2006-102539, the contents of which are incorporated herein by reference.

BACKGROUND OF THE INVENTION

1. Field of the Invention

The present invention relates to image signal processing and to a method for interpolating chrominance signals in a video encoder and a decoder based on optimized computation and memory access so that interpolation can be performed efficiently with little power consumption.

2. Description of the Related Art

As generally known in the art, image compression is based on a number of compression standards, including MPEG and H.26x, and such image compression techniques are widely used for video players, VODs, video telephones, DMB, etc. In addition, development of wireless communication (e.g. 2.5G/3G) has resulted in commercialized image transmission on a wireless mobile basis.

Most moving image compression standards, including MPEG- or H.26x-series moving image codecs, adopt a compression scheme based on motion estimation/compensation and transformation. In the case of encoding based on such motion estimation/compensation, information regarding the motion vector of each block must be encoded and transmitted. In addition, how the motion vector is encoded may greatly affect the compression efficiency.

Recently, ITU-T and ISO has jointly established H.264 as the next-generation moving image compression standard, which has progressed remarkably from conventional technical standards (e.g. MPEG-2, MPEG-4 (Part 2)) in terms of flexible adaptation to various network environments and efficient encoding of moving images.

Images are generally encoded in the following manner: a digital image signal is subjected to DCT (Discrete Cosine Transform); a DCT coefficient is quantized so as to perform VLC (Variable Length Coding); the quantized DCT coefficient is inversely quantized and subjected to inverse DCT so that the image is restored and stored in a memory; the stored image and the next frame image are used to obtain a motion vector; and the motion vector is subjected to VLC so as to constitute a bit stream together with the encoded image information and transmit it. Decoding of images follows the opposite order.

Methods for compressing and encoding images are based on spatial redundancy and/or temporal redundancy. In the case of a moving image codec based on temporal redundancy, the temporal redundancy with regard to the previous frame can be efficiently eliminated by using the motion vector of macro blocks. For example, the codec searches for a macro block most similar to the macro block of the current frame from a previous frame (reference frame). As a standard for determining similarity between the macro block of the current frame and that of the previous frame, the codec calculates the square of distance between two vectors and searches for a macro block having the smallest square. In this manner, the redundancy between frames is efficiently eliminated so as to improve the compression efficiency.

Figure 1:
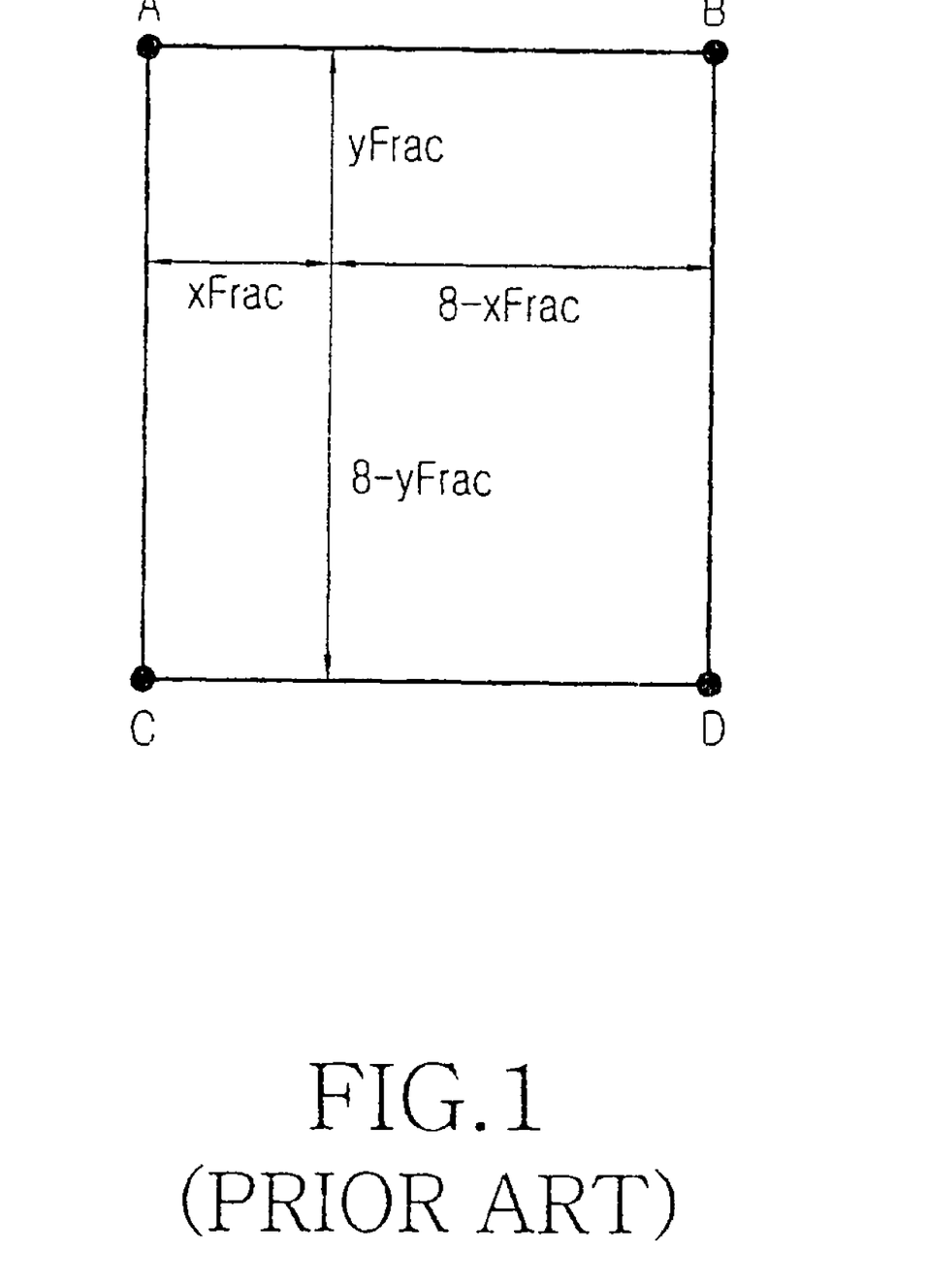
FIG. 1 shows a conventional H.264 compression codec interpolating chrominance signals.

FIG. 1 shows a conventional H.264 compression codec interpolating chrominance signals.

Referring to FIG. 1, the chrominance signal sub-pixel interpolation method based on H.264 uses ⅛ interpolation. That is, it simply uses integer pixel values adjacent to a location indicated by a motion vector. Particularly, the interpolation is based on four adjacent integer pixel values as defined by equation (1).

$$\text{Pred\_Pixel} = ((8 - xFrac) * (8 - yFrac) * A + xFrac * (8 - yFrac) * B + \\ (8 - xFrac) * yFrac * C + xFrac * yFrac * D + 32) >> 6 \quad (1)$$

wherein, ">>" refers to rightward bit-shift

This method has the advantage of high interpolation performance by using adjacent integer pixels. However, the sub-pixel value of ⅛ location cannot be obtained but from a single formula.

Basically, a luma signal interpolation method based on H.264 performs ¼ sub-pixel computation, and the resulting chrominance signal interpolation method is based on ⅛ interpolation. This chrominance signal interpolation method, which uses ⅛ sub-pixels, has been developed to obtain higher accuracy by using four adjacent integer pixels only. However, this interpolation method has a problem in that, since the formula requires many multiplication steps and inefficient memory access, the overall amount of computation increases. Therefore, an alternative computation method is necessary with regard to the chrominance signal interpolation method based on H.264. Particularly, a method for reducing the memory access frequency is requested. To this end, the calculation characteristics of H.264 video encoders and decoders must be analyzed for more efficient computation with a smaller size.

SUMMARY OF THE INVENTION

Accordingly, the present invention has been made to solve the above-mentioned problems occurring in the prior art, and an aspect of the present invention is to provide a new chrominance signal interpolation method exhibiting optimized computation and memory access so that a codec can function efficiently with little power consumption.

In one embodiment, there is provided a method for interpolating chrominance signals in a video encoder and a decoder, the method including the steps of accessing a memory unit so as to load an integer pixel value with regard to a plurality of motion compensation blocks, searching for a location of a motion vector so as to perform sub-pixel interpolation of chrominance signals regarding the blocks and performing ¼ sub-pixel interpolation by means of row-based and column-based shifting when the motion vector indicates a ¼ location pixel with regard to the blocks.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE INVENTION

Hereinafter, embodiments of the present invention will be described with reference to the accompanying drawings. In the following description of the present invention, a detailed description of known functions and configurations incorporated herein is omitted to avoid making the subject matter of the present invention unclear.

Figure 2:
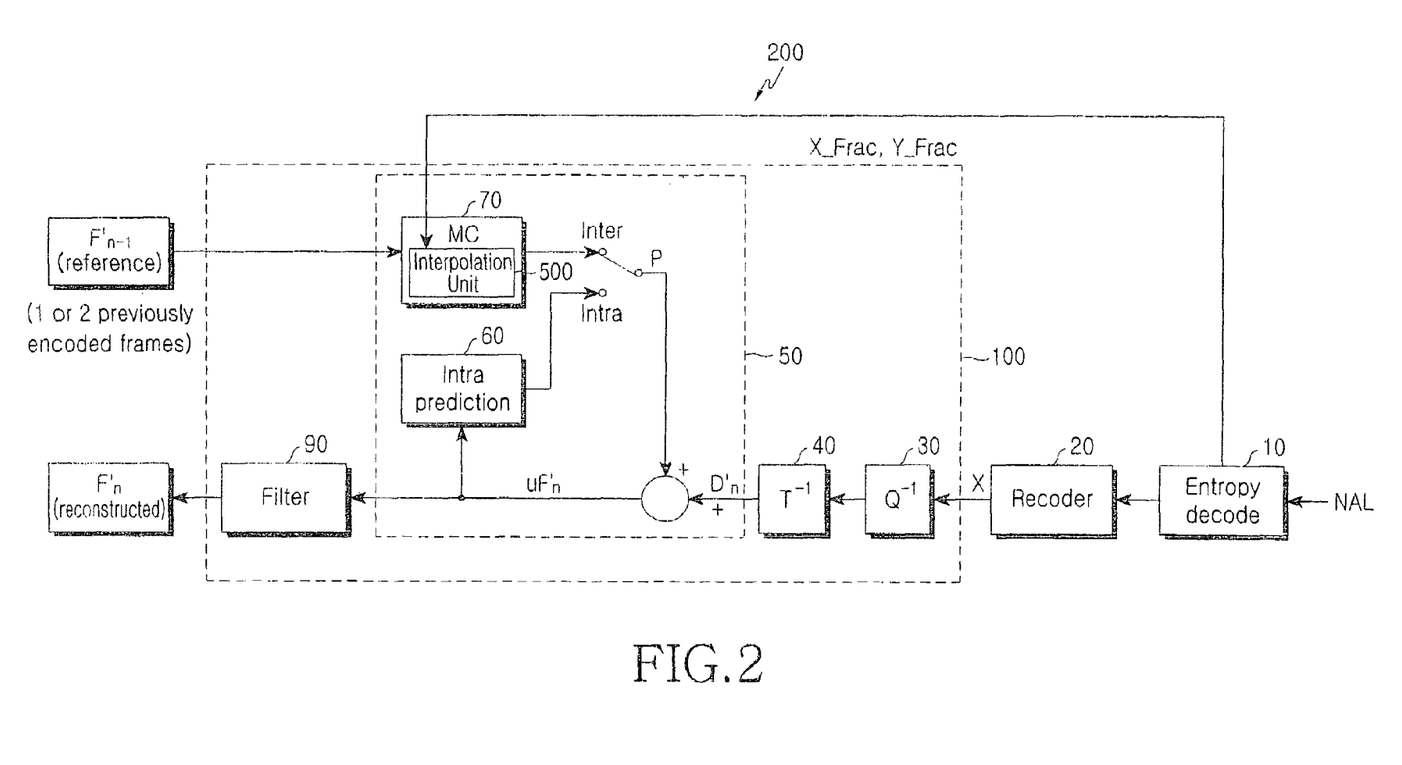
FIG. 2 is a block diagram of an MPEG decoder according to one embodiment of the present invention.
Figure 3:
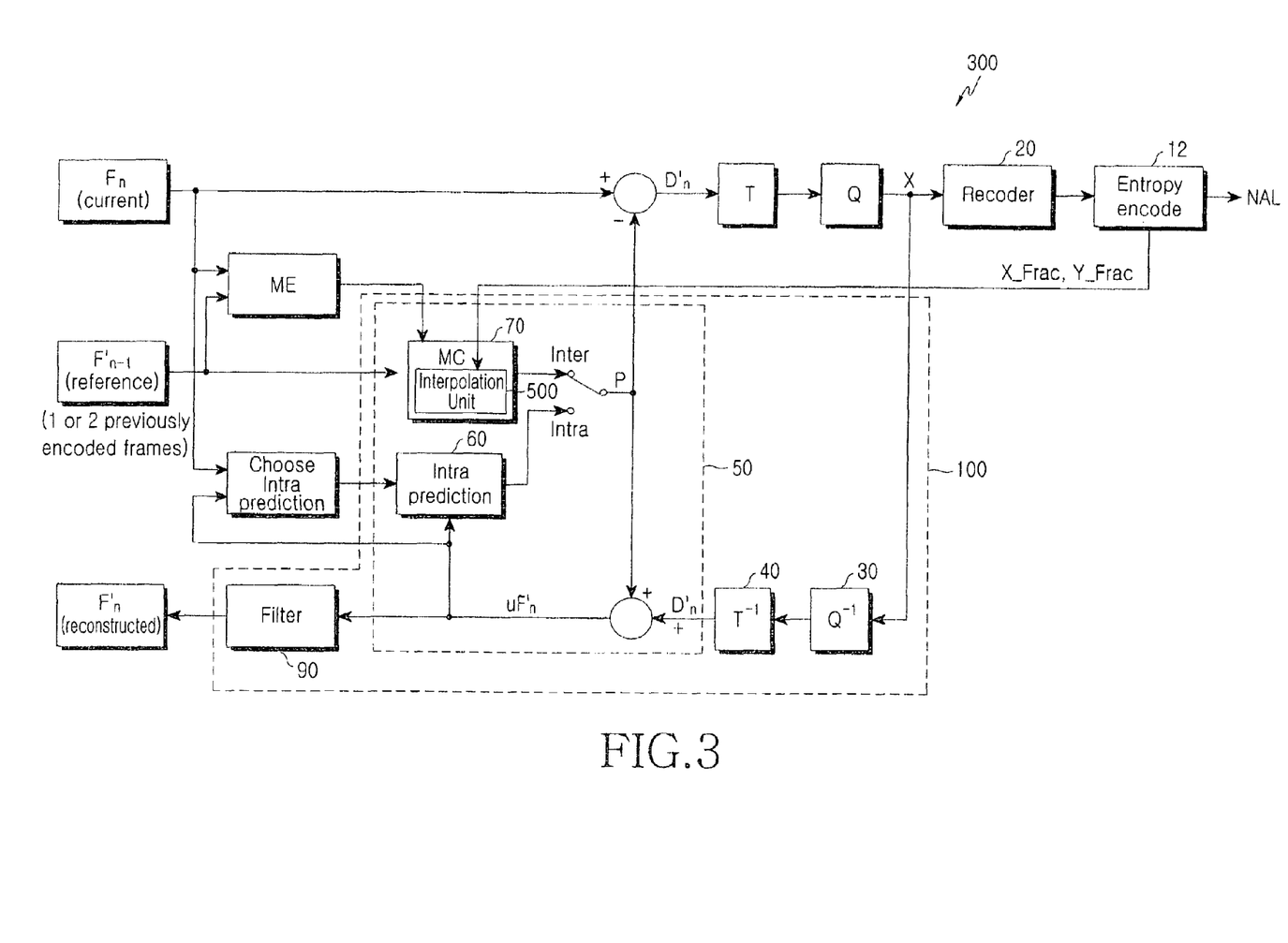
FIG. 3 is a block diagram of an MPEG encoder according to one embodiment of the present invention.

FIG. 2 is a block diagram of an MPEG decoder 200 according to a first exemplary embodiment of the present invention, and FIG. 3 is a block diagram of an MPEG encoder 300 according the embodiment of the present invention.

As shown in FIGS. 2 and 3, the MPEG decoder and encoder 200 and 300 have a circuit based on H.264 standards, and the same components are given the same reference numerals. In particular, the region labeled 100 is included in both the decoder 200 and the encoder 300 according to H.264 standards. For brevity, the circuit configuration of the MPEG decoder 200 will solely be described. However, it would be recognized that the circuit configuration description is also applicable to an encoder.

Referring to FIG. 2, the MPEG decoder 200 includes a entropy decoding unit 10 for receiving an NAL (Network Abstraction Layer), which is a compressed bit stream, and performing entropy decoding, a reordering unit 20 for reordering the data into groups, an inverse quantization unit 30 for inversely quantizing data outputted by the reordering unit 20, an inverse discrete cosine transform (hereinafter, referred to as IDCT) unit 40 for subjecting the inversely quantized data to IDCT, an intra/inter-screen data prediction unit 50 for performing intra-screen prediction or inter-screen prediction and compensation and an in-loop deblocking filter 90 for eliminating errors which have occurred during the inverse quantization process. The intra/inter-screen data prediction unit 50 includes an intra-screen prediction unit 60 for performing intra-screen prediction and a motion compensation unit 70 for performing inter-screen prediction. The motion compensation unit 70 includes an interpolation unit 500 for interpolating images so that motion compensation becomes more precise.

The decoder 200 and encoder 300 respectively shown in FIGS. 2 and 3 follow H.264 standards, and the interpolation unit 500 performs ¼ interpolation.

More particularly, the interpolation unit 500 selectively conducts a ¼ interpolation process in response to a motion vector (X_Frac, Y_Frac) provided by the entropy decoding unit 10. During the interpolation process of the interpolation unit 500, data stored in the register (not shown) of an external memory unit is obtained by simply shifting it row by row and column by column. This guarantees fast calculations. In addition, the interpolation unit 500 has a simple overall structure, because it has a minimum register applicable to all sub-macro blocks with various sizes. Prior to description of the detailed construction of the interpolation unit 500, the operation and result of interpolation of decoded images will now be described.

Figure 4:
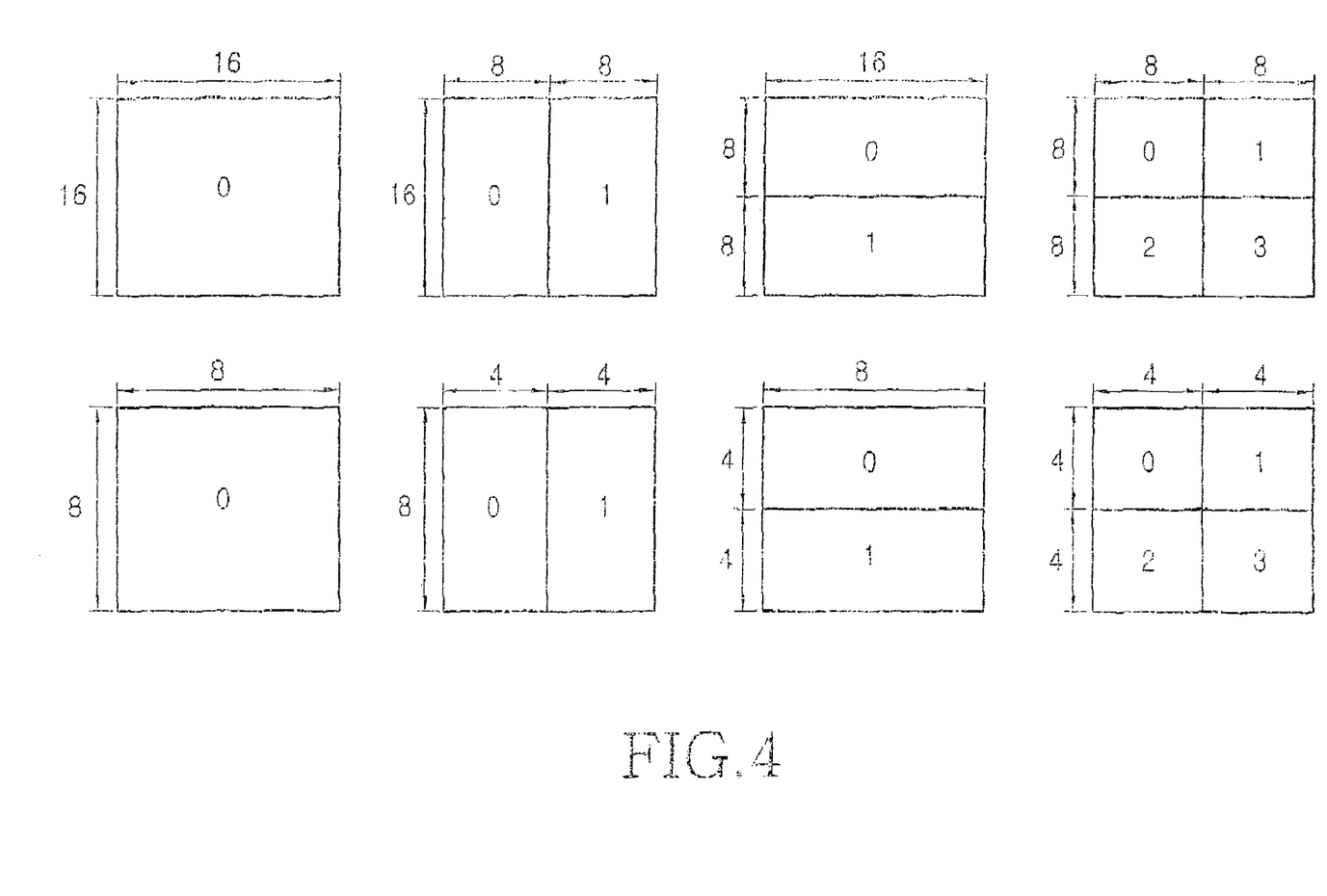
FIG. 4 shows examples of motion compensation blocks acting as a unit of motion compensation according to an embodiment of the present invention.

FIG. 4 shows examples of motion compensation blocks acting as a unit of motion compensation according to a preferred embodiment of the present invention.

Referring to FIG. 4, the memory unit consists of a number of motion compensation blocks, including not only 16×16 macro blocks according to the present embodiment, but also 16×8 reference blocks obtained by bisecting a macro block in the horizontal direction, 8×16 blocks obtained by bisecting a macro block in the vertical direction, 8×8 blocks obtained by bisecting a macro block in the horizontal and vertical directions, 8×4 or 4×8 blocks obtained by bisecting a 8×8 block in the horizontal or vertical direction, and 4×4 blocks obtained by bisecting a 8×8 block in the horizontal and vertical directions.

Figure 5:
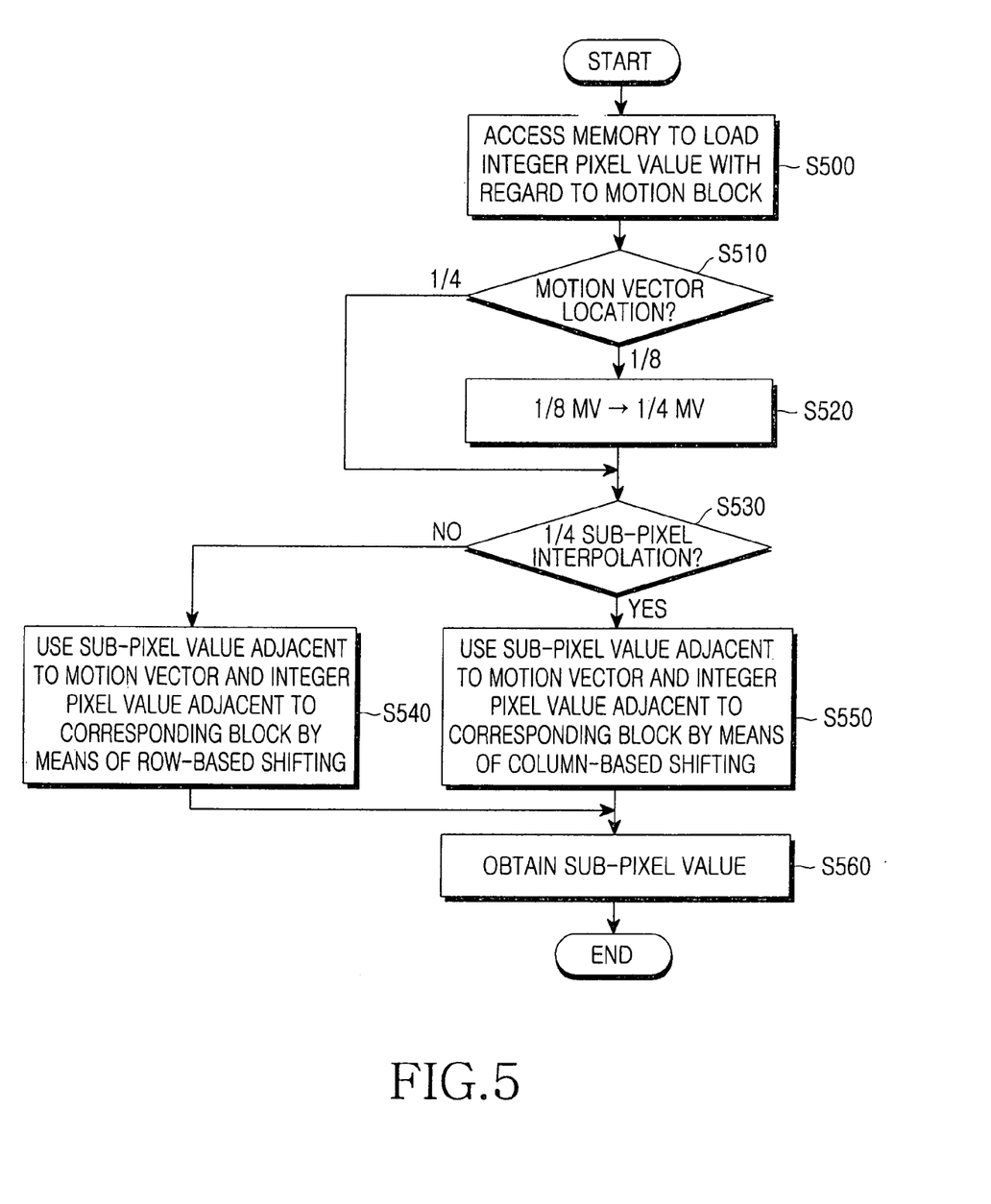
FIG. 5 is a flowchart showing an interpolation process according to an exemplary embodiment of the present invention.

FIG. 5 is a flowchart shows an interpolation process according to an exemplary embodiment of the present invention.

With regard to a plurality of motion compensation blocks having various sizes, the interpolation unit needs an integer pixel value of a corresponding block, which has accessed the memory unit, and a pixel value adjacent to a region indicated by a motion vector (X_Frac, Y_Frac) provided by the entropy decoding unit 10. That is, for the purpose of sub-pixel interpolation regarding the corresponding block, access to the memory unit is necessary to load an integer pixel value related to the chrominance signal of the corresponding block (S500).

In order to perform sub-pixel interpolation of the chrominance signal concerning the corresponding block, the interpolation unit searches for the location of the motion vector (X_Frac, Y_Frac) provided by the decoding unit 10 (S510). When the motion vector (X_Frac, Y_Frac) provided by the entropy decoding unit 10 indicates a ¼ location pixel value itself, the ¼ interpolation unit 580 outputs ¼ interpolation results as they are. When the motion vector (X_Frac, Y_Frac) provided by the entropy decoding unit 10 indicates a ⅛ location pixel, the interpolation unit, which follows H.264 standards, divides the ⅛ location pixel value by 2 and rounds it off so that it is converted into a ¼ location pixel (S520), as defined by equation (2).

$$¼MV = (⅛MV+1) \gg 1 \qquad (2)$$

wherein, "$\gg$" refers to rightward bit-shift.

In order to perform ¼ interpolation with regard to the corresponding block, the interpolation unit must create a pixel value of a sub-pixel location and uses a separate calculation formula, which has been optimized for each sub-pixel location, to obtain the sub-pixel value of the interpolated chrominance signal.

Figure 6:
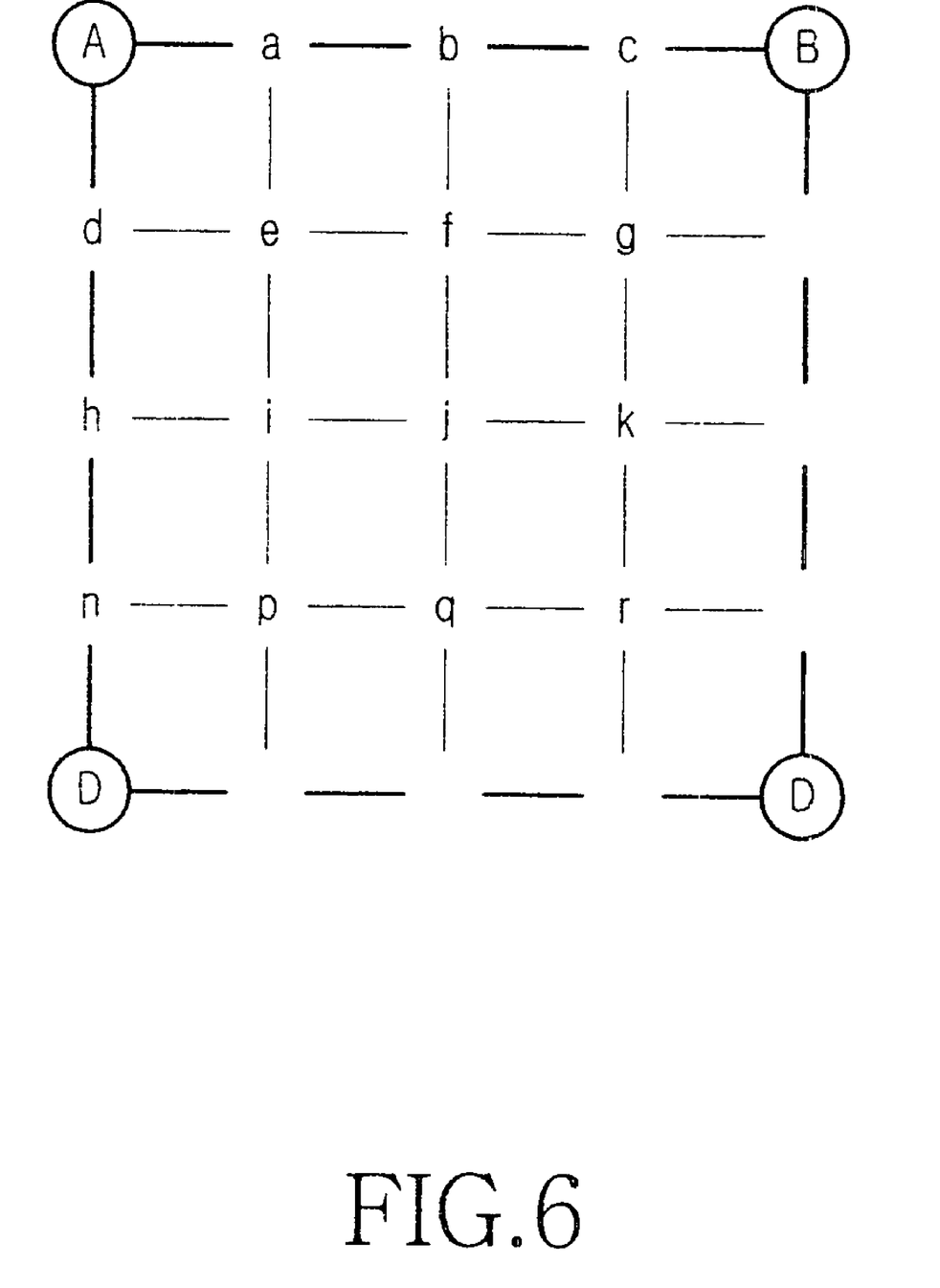
FIG. 6 partially illustrates pixels constituting a motion compensation block according to an exemplary embodiment of the present invention.

FIG. 6 partially illustrates pixels constituting a motion compensation block according to an exemplary embodiment of the present invention.

Referring to FIG. 6, pixels locations due for ¼ sub-pixel interpolation by the interpolation unit are a, b, c, d, e, f, g, h, i, j, k, n, p, q, and r. In FIG. 6, A, B, C, and D refer to integer location pixel values. That is, interpolation is performed based on these pixel values A, B, C, and D to obtain sub-pixel values for respective locations a to r.

Particularly, sub-pixels of respective locations due for interpolation are calculated continuously, and intermediate result values used to calculate adjacent sub-pixels are used again. This means that six adjacent integer pixels are used to calculate two sub-pixel values (a1, a2~r1, r2) (see FIG. 7).

The ¼ sub-pixel interpolation according to the present invention can be performed in one of the following schemes, depending on the location of the motion vector (X_Frac, Y_Frac) provided by the entropy decoding unit 10 with regard to a plurality of motion compensation blocks (S530).

Figure 7:
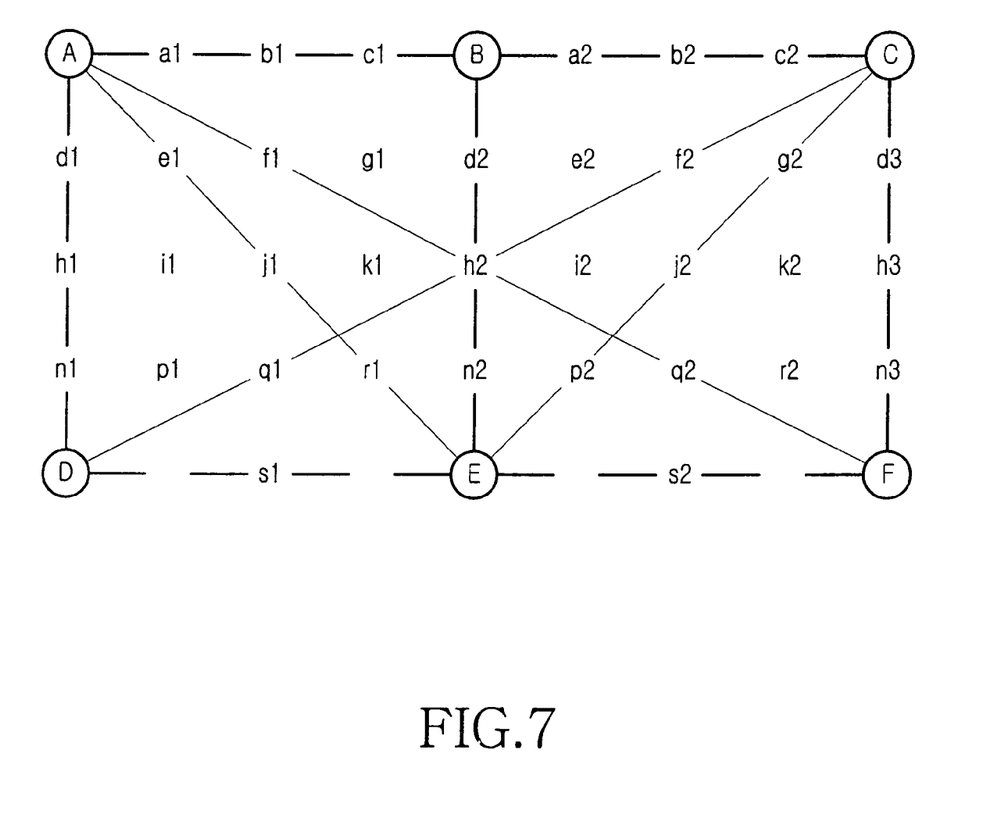
FIG. 7 shows an interpolation process according to an exemplary embodiment of the present invention.

FIG. 7 shows interpolation process according to an exemplary embodiment of the present invention.

Scheme 1

Referring to FIG. 7, the interpolation unit calculates sub-pixel values of locations a, b, c, d, h, and n by means of row-based shifting according to the location of the motion vector (X_Frac, Y_Frac) provided by the entropy decoding unit 10 with regard to a plurality of motion compensation blocks. Particularly, the interpolation unit calculates the sub-pixel value of the location indicated by the motion vector (X_Frac, Y_Frac) by using integer pixel values adjacent to the corresponding block (S540). In this case, b1 and b2 refer to sub-pixel values of existing location b, and h1 and h2 refer to sub-pixel values of existing location h.

In addition, calculation is made by using sub-pixel values adjacent to the location indicated by the motion vector (X_Frac, Y_Frac) provided by the entropy decoding unit 10, as well as integer location pixel values adjacent to the corresponding block. In this case, a1 and a2 correspond to location a shown in FIG. 6, i.e. they refer to sub-pixel values of existing location a. Similarly, c1 and c2 refer to sub-pixel values of existing location c; d1 and d2 refer to sub-pixel values of existing location d; and n1 and n2 refer to sub-pixel values of existing location n. Respective sub-pixel values are obtained as defined by equation (3) below.

$$b1=(A+B+1)>>1, b2=(B+C+1)>>1$$

$$h1=(A+D+1)>>1, h2=(B+E+1)>>1$$

$$a1=(A+b1+1)>>1, a2=(B+b2+1)>>1$$

$$c1=(B+b1+1)>>1, c2=(C+b2+1)>>1$$

$$d1=(A+h1+1)>>1, d2=(B+h2+1)>>1$$

$$n1=(D+h1+1)>>1, n2=(E+h2+1)>>1 \quad (3)$$

wherein, ">>" refers to rightward bit-shift.

Scheme 2

The interpolation unit calculates sub-pixel values of locations f, j, and q based on the location of the motion vector (X_Frac, Y_Frac) provided by the entropy decoding unit 10. Particularly, the calculation is based on sub-pixel values adjacent to the location indicated by the motion vector (X_Frac, Y_Frac) provided by the entropy decoding unit 10, as well as integer pixel values adjacent to the corresponding block (S550). In this case, f1 and f2 refer to sub-pixel values of existing location f; j1 and j2 refer to sub-pixel values of existing location j; and q1 and q2 refer to sub-pixel values of existing location q. Respective sub-pixel values are obtained as defined by equation (4).

$$f1=(A+h2+1)>>1, f2=(C+h2+1)>>1$$

$$q1=(D+h2+1)>>1, q2=(F+h2+1)>>1$$

$$j1=(A+E+1)>>1, j2=(C+E+1)>>1 \quad (4)$$

wherein, ">>" refers to rightward bit-shift.

Figure 8:
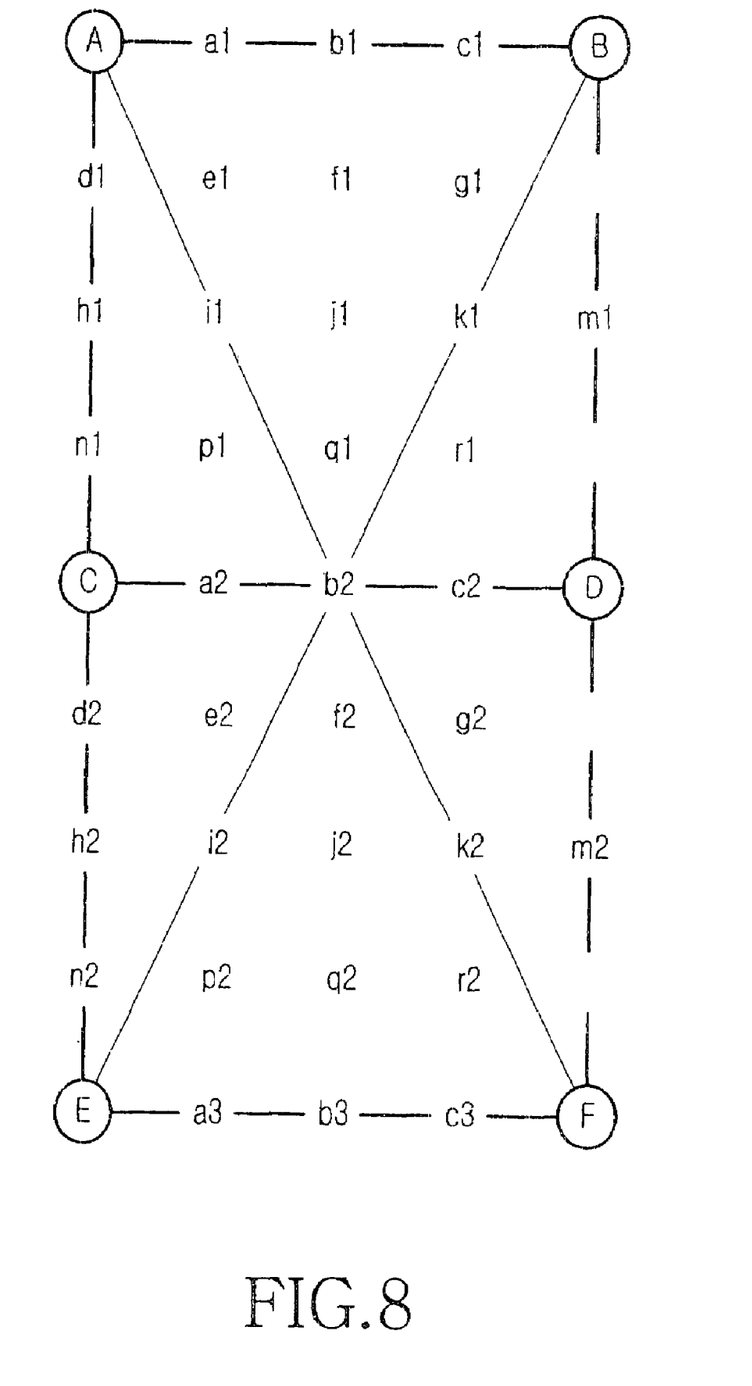
FIG. 8 shows an interpolation process according to another exemplary embodiment of the present invention.

FIG. 8 shows an interpolation process according to another exemplary embodiment of the present invention.

Scheme 3

Referring to FIG. 8, the interpolation unit calculates sub-pixel values of locations i and k by means of column-based shifting according to the location of the motion vector (X_Frac, Y_Frac) provided by the entropy decoding unit 10 with regard to a plurality of motion compensation blocks. Particularly, the calculation is based on sub-pixel values adjacent to the location indicated by the motion vector (X_Frac, Y_Frac) provided by the entropy decoding unit 10, as well as integer pixel values adjacent to the corresponding block (S560). In this case, i1 and i2 refer to sub-pixel values of existing location i, and k1 and k2 refer to sub-pixel values of existing location k. Respective sub-pixel values are obtained as defined by equation (5).

$$i1=(A+b2+1)>>1, i2=(E+b2+1)>>1$$

$$k1=(B+b2+1)>>1, k2=(F+b2+1)>>1 \quad (5)$$

wherein, ">>" refers to rightward bit-shift.

Figure 9:
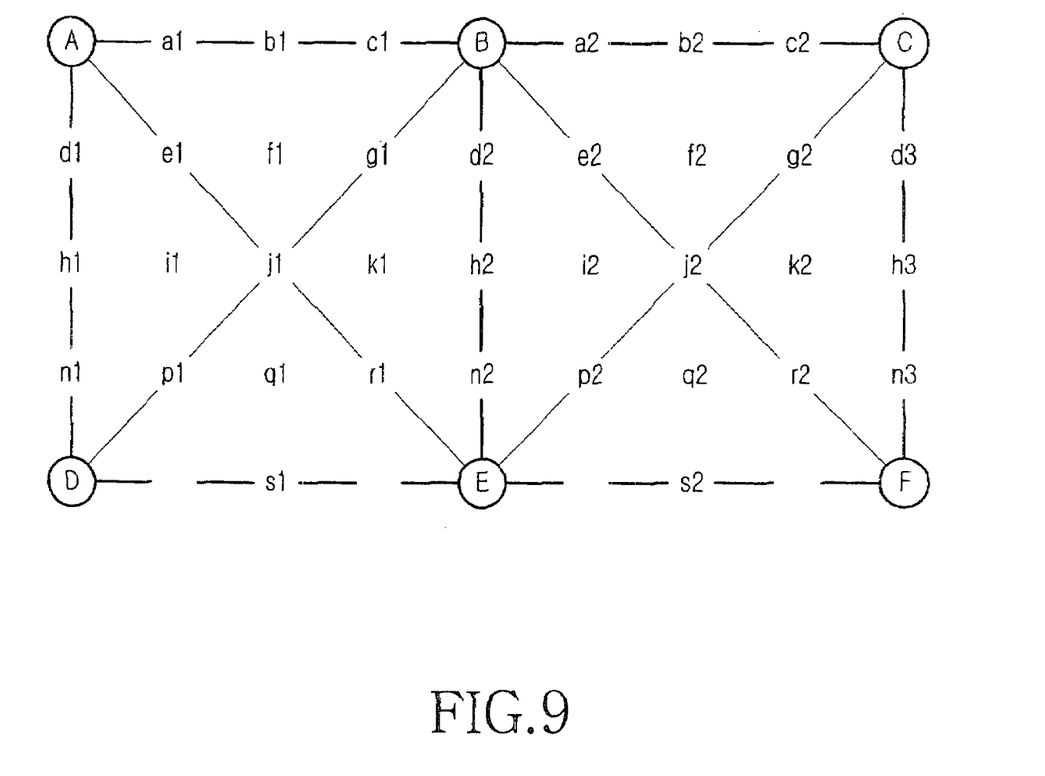
FIG. 9 shows another interpolation process according to another exemplary embodiment of the present invention.

FIG. 9 shows an interpolation process according to another exemplary embodiment of the present invention.

Scheme 4

Referring to FIG. 9, the interpolation unit calculates sub-pixel values of locations e, g, p and r by means of row-based shifting according to the location of the motion vector (X_Frac, Y_Frac) provided by the entropy decoding unit 10 with regard to a plurality of motion compensation blocks. Particularly, the calculation is based on sub-pixel values adjacent to the location indicated by the motion vector (X_Frac, Y_Frac) provided by the entropy decoding unit 10, as well as integer pixel values adjacent to the corresponding block (S570). In this case, e1 and e2 refer to sub-pixel values of existing location e; g1 and g2 refer to sub-pixel values of existing location g; p1 and p2 refer to sub-pixel values of existing location p; and r1 and r2 refer to sub-pixel values of existing location r. Respective sub-pixel values are obtained as defined by equation (6).

$$e1=(A+j1+1)>>1, \text{ wherein } j1=(B+D+1)>>1$$

$$e2=(B+j2+1)>>1, \text{ wherein } j2=(C+E+1)>>1$$

$$g1=(B+j1+1)>>1, \text{ wherein } j1=(A+E+1)>>1$$

$$g2=(C+j2+1)>>1, \text{ wherein } j2=(B+F+1)>>1$$

$$p1=(D+j1+1)>>1, \text{ wherein } j1=(A+E+1)>>1$$

$$p2=(E+j2+1)>>1, \text{ wherein } j2=(B+F+1)>>1$$

$$r1=(E+j1+1)>>1, \text{ wherein } j1=(B+D+1)>>1$$

$$r2=(F+j2+1)>>1, \text{ wherein } j2=(C+E+1)>>1 \quad (6)$$

wherein, ">>" refers to rightward bit-shift.

It is to be noted with regard to the above equation that the value of j1 and j2, which are used to created sub-pixel values for respective locations, are obtained in different methods.

As mentioned above, the interpolation unit 500 according to the present invention does not perform ⅛ interpolation, which requires a large amount of calculation, but performs ¼ interpolation in a discrete and gradual manner.

The ¼ interpolation process is selectively performed with reference to the motion vector, and ¼ interpolation computation is performed fast by simply shifting data, which is stored in the register, row by row and column by column. Compared with conventional chrominance signal interpolation methods based on H.264, the inventive process has the advantages of fast computation because it involves no multiplication and undergoes infrequent memory access. In addition, the fact that all sizes of variable macro blocks are supported for the sake of interpolation, which is performed in the direction of motion of all pixels, simplifies the structure.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for interpolating chrominance signals during video encoding/decoding, the method comprising the steps of:
   accessing a memory unit so as to load an integer pixel value with regard to a plurality of motion compensation blocks;
   searching for a location of a motion vector so as to perform sub-pixel interpolation of chrominance signals regarding the blocks;
   performing ¼ sub-pixel interpolation when the motion vector indicates a ⅛ location pixel with regard to the pixels, by converting the ⅛ location pixel into a ¼ location pixel as:

$$¼MV=(⅛MV+1)>>1,$$

wherein ">>" refers to rightward bit-shift; and
   performing ¼ sub-pixel interpolation by means of row-based and column-based shifting when the motion vector indicates a ¼ location pixel with regard to the blocks.

2. The method as claimed in claim 1, wherein, during the ¼ sub-pixel interpolation, a sub-pixel value of a location indicated by the motion vector is calculated by row-based shifting with regard to the blocks and by using a sub-pixel value adjacent to the location and an integer pixel value of a location adjacent to a corresponding block.

3. The method as claimed in claim 2, wherein, when the motion vector is positioned at sub-pixels of locations a, b, c, d, h, and n, the sub-pixel value is calculated and obtained as:

$$b1=(A+B+1)>>1, b2=(B+C+1)>>1$$
   $$h1=(A+D+1)>>1, h2=(B+E+1)>>1$$
   $$a1=(A+b1+1)>>1, a2=(B+b2+1)>>1$$
   $$c1=(B+b1+1)>>1, c2=(C+b2+1)>>1$$
   $$d1=(A+h1+1)>>1, d2=(B+h2+1)>>1$$
   $$n1=(D+h1+1)>>1, n2=(E+h2+1)>>1$$

wherein, ">>" refers to rightward bit-shift.

4. The method as claimed in claim 3, wherein, when the motion vector is positioned at sub-pixels of locations f j, and q, the sub-pixel value is calculated and obtained as:

$$f1=(A+h2+1)>>1, f2=(C+h2+1)>>1$$
   $$q1=(D+h2+1)>>1, q2=(F+h2+1)>>1$$
   $$j1=(A+E+1)>>1, j2=(C+E+1)>>1$$

wherein, ">>" refers to rightward bit-shift.

5. The method as claimed in claim 3, wherein, when the motion vector is positioned at sub-pixels of locations e, g, p and r, the sub-pixel value is calculated and obtained as:

$$e1=(A+j1+1)>>1, \text{wherein } j1=(B+D+1)>>1$$
   $$e2=(B+j2+1)>>1, \text{wherein } j2=(C+E+1)>>1$$
   $$g1=(B+j1+1)>>1, \text{wherein } j1=(A+E+1)>>1$$
   $$g2=(C+j2+1)>>1, \text{wherein } j2=(B+F+1)>>1$$
   $$p1=(D+j1+1)>>1, \text{wherein } j1=(A+E+1)>>1$$
   $$p2=(E+j2+1)>>1, \text{wherein } j2=(B+F+1)>>1$$
   $$r1=(E+j1+1)>>1, \text{wherein } j1=(B+D+1)>>1$$
   $$r2=(F+j2+1)>>1, \text{wherein } j2=(C+E+1)>>1$$

wherein, ">>" refers to rightward bit-shift.

6. The method as claimed in claim 1, wherein, when the motion vector is positioned at sub-pixels of locations i and k, the sub-pixel value is calculated and obtained as:

$$i1=(A+b2+1)>>1, i2=(E+b2+1)>>1$$
   $$k1=(B+b2+1)>>1, k2=(F+b2+1)>>1$$

wherein, ">>" refers to rightward bit-shift.

7. An apparatus for interpolating chrominance signals in a video encoder/decoder, the apparatus comprising:
   a memory unit containing a plurality of integer pixel values with regard to a plurality of motion compensation blocks;
   means for accessing the memory unit to select said plurality of integer pixel values;
   means for searching for a location of a motion vector so as to perform sub-pixel interpolation of chrominance signals regarding the blocks;
   means for performing ¼ sub-pixel interpolation when the motion vector indicates a ⅛ location pixel with regard to the pixels, by converting the ⅛ location pixel into a ¼ location pixel as:

$$¼MV=⅛MV+1)>>1,$$

wherein ">>" refers to rightward bit-shift; and
   means for performing ¼ sub-pixel interpolation by means of row-based and column-based shifting when the motion vector indicates a ¼ location pixel with regard to the blocks.

8. The apparatus as claimed in claim 7, wherein, during the ¼ sub-pixel interpolation, a sub-pixel value of a location indicated by the motion vector is calculated by row-based shifting with regard to the blocks and by using a sub-pixel value adjacent to the location and an integer pixel value of a location adjacent to a corresponding block.

9. The apparatus as claimed in claim 8, wherein, when the motion vector is positioned at sub-pixels of locations a, b, c, d, h, and n, the sub-pixel value is calculated and obtained as:

$$b1=(A+B+1)>>1, b2=(B+C+1)>>1$$

$$h1=(A+D+1)\gg 1, h2=(B+E+1)\gg 1$$

$$a1=(A+b1+1)\gg 1, a2=(B+b2+1)\gg 1$$

$$c1=(B+b1+1)\gg 1, c2=(C+b2+1)\gg 1$$

$$d1=(A+h1+1)\gg 1, d2=(B+h2+1)\gg 1$$

$$n1=(D+h1+1)\gg 1, n2=(E+h2+1)\gg 1$$

wherein, ">>" refers to rightward bit-shift.

10. The apparatus as claimed in claim 9, wherein, when the motion vector is positioned at sub-pixels of locations f, j, and q, the sub-pixel value is calculated and obtained as:

$$f1=(A+h2+1)\gg 1, f2=(C+h2+1)\gg 1$$

$$q1=(D+h2+1)\gg 1, q2=(F+h2+1)\gg 1$$

$$j1=(A+E+1)\gg 1, j2=(C+E+1)\gg 1$$

wherein, ">>" refers to rightward bit-shift.

11. The apparatus as claimed in claim 9, wherein, when the motion vector is positioned at sub-pixels of locations e, g, p and r, the sub-pixel value is calculated and obtained as:

$$e1=(A+j1+1)\gg 1, \text{wherein } j1=(B+D+1)\gg 1$$

$$e2=(B+j2+1)\gg 1, \text{wherein } j2=(C+E+1)\gg 1$$

$$g1=(B+j1+1)\gg 1, \text{wherein } j1=(A+E+1)\gg 1$$

$$g2=(C+j2+1)\gg 1, \text{wherein } j2=(B+F+1)\gg 1$$

$$p1=(D+j1+1)\gg 1, \text{wherein } j1=(A+E+1)\gg 1$$

$$p2=(E+j2+1)\gg 1, \text{wherein } j2=(B+F+1)\gg 1$$

$$r1=(E+j1+1)\gg 1, \text{wherein } j1=(B+D+1)\gg 1$$

$$r2=(F+j2+1)\gg 1, \text{wherein } j2=(C+E+1)\gg 1$$

wherein, ">>" refers to rightward bit-shift.

12. The apparatus as claimed in claim 7, wherein, when the motion vector is positioned at sub-pixels of locations i and k, the sub-pixel value is calculated and obtained as:

$$i1=(A+b2+1)\gg 1, i2=(E+b2+1)\gg 1$$

$$k1=(B+b2+1)\gg 1, k2=(F+b2+1)\gg 1$$

wherein, ">>" refers to rightward bit-shift.

13. A video encoder/decoder interpolating chrominance signals comprising:
 a processor in communication with a memory, the processor executing code for:
  accessing a memory unit containing a plurality of integer pixel values with regard to a plurality of motion compensation blocks;
  searching for a location of a motion vector so as to perform sub-pixel interpolation of chrominance signals regarding the blocks
  performing ¼ sub-pixel interpolation when the motion vector indicates a ⅛ location pixel with regard to the pixels, by converting the ⅛ location pixel into a ¼ location pixel as:

$$\tfrac{1}{4}MV=(\tfrac{1}{8}MV+1)\gg 1,$$

wherein ">>" refers to rightward bit-shift; and
  performing ¼ sub-pixel interpolation by means of row-based and column-based shifting when the motion vector indicates a ¼ location pixel with regard to the blocks.

14. The encoder/decoder as claimed in claim 13, wherein, during the ¼ sub-pixel interpolation, a sub-pixel value of a location indicated by the motion vector is calculated by row-based shifting with regard to the blocks and by using a sub-pixel value adjacent to the location and an integer pixel value of a location adjacent to a corresponding block.

15. The encoder as claimed in claim 14, wherein, when the motion vector is positioned at sub-pixels of locations a, b, c, d, h, and n, the sub-pixel value is calculated and obtained as:

$$b1=(A+B+1)\gg 1, b2=(B+C+1)\gg 1$$

$$h1=(A+D+1)\gg 1, h2=(B+E+1)\gg 1$$

$$a1=(A+b1+1)\gg 1, a2=(B+b2+1)\gg 1$$

$$c1=(B+b1+1)\gg 1, c2=(C+b2+1)\gg 1$$

$$d1=(A+h1+1)\gg 1, d2=(B+h2+1)\gg 1$$

$$n1=(D+h1+1)\gg 1, n2=(E+h2+1)\gg 1$$

wherein, ">>" refers to rightward bit-shift.

16. The encoder as claimed in claim 15, wherein, when the motion vector is positioned at sub-pixels of locations f, j, and q, the sub-pixel value is calculated and obtained as:

$$f1=(A+h2+1)\gg 1, f2=(C+h2+1)\gg 1$$

$$q1=(D+h2+1)\gg 1, q2=(F+h2+1)\gg 1$$

$$j1=(A+E+1)\gg 1, j2=(C+E+1)\gg 1$$

wherein, ">>" refers to rightward bit-shift.

17. The encoder as claimed in claim 15, wherein, when the motion vector is positioned at sub-pixels of locations e, g, p and r, the sub-pixel value is calculated and obtained as:

$$e1=(A+j1+1)\gg 1, \text{wherein } j1=(B+D+1)\gg 1$$

$$e2=(B+j2+1)\gg 1, \text{wherein } j2=(C+E+1)\gg 1$$

$$g1=(B+j1+1)\gg 1, \text{wherein } j1=(A+E+1)\gg 1$$

$$g2=(C+j2+1)\gg 1, \text{wherein } j2=(B+F+1)\gg 1$$

$$p1=(D+j1+1)\gg 1, \text{wherein } j1=(A+E+1)\gg 1$$

$$p2=(E+j2+1)\gg 1, \text{wherein } j2=(B+F+1)\gg 1$$

$$r1=(E+j1+1)\gg 1, \text{wherein } j1=(B+D+1)\gg 1$$

$$r2=(F+j2+1)\gg 1, \text{wherein } j2=(C+E+1)\gg 1$$

wherein, ">>" refers to rightward bit-shift.

18. The encoder as claimed in claim 13, wherein, when the motion vector is positioned at sub-pixels of locations i and k, the sub-pixel value is calculated and obtained as:

$$i1=(A+b2+1)\gg 1, i2=(E+b2+1)\gg 1$$

$$k1=(B+b2+1)\gg 1, k2=(F+b2+1)\gg 1$$

wherein, ">>" refers to rightward bit-shift.

19. A computer program product providing code, which when accessed by a processor causes the processor to execute the steps of:
 accessing a plurality of integer pixel values with regard to a plurality of motion compensation blocks;
 searching for a location of a motion vector so as to perform sub-pixel interpolation of chrominance signals regarding the blocks, performing ¼ sub-pixel interpolation when the motion vector indicates a ⅛ location pixel with regard to the pixels, by converting the ⅛ location pixel into a ¼ location pixel as:

¼MV=(⅛MV+1)>>1, wherein ">>" refers to rightward bit-shift; and performing ¼ sub-pixel interpolation by means of row-based and column-based shifting when the motion vector indicates a ¼ location pixel with regard to the blocks.

20. A method for interpolating chrominance signals during video encoding/decoding, the method comprising the steps of:

accessing a memory unit so as to load an integer pixel value with regard to a plurality of motion compensation blocks;

searching for a location of a motion vector so as to perform sub-pixel interpolation of chrominance signals regarding the blocks; and performing ¼ sub-pixel interpolation without multiplication by means of row-based and column-based shifting when the motion vector indicates a ¼ location pixel with regard to the blocks.

* * * * *

UNITED STATES PATENT AND TRADEMARK OFFICE
CERTIFICATE OF CORRECTION

| | |
|---|---|
| PATENT NO. | : 8,189,672 B2 |
| APPLICATION NO. | : 11/893811 |
| DATED | : May 29, 2012 |
| INVENTOR(S) | : Kwang-Pyo Choi et al. |

Page 1 of 1

It is certified that error appears in the above-identified patent and that said Letters Patent is hereby corrected as shown below:

Column 7, Claim 3, Line 67 should read as follows:
--...refers to rightward bit-shift.--

Signed and Sealed this
Twenty-third Day of October, 2012

David J. Kappos
*Director of the United States Patent and Trademark Office*